Patented Apr. 6, 1954

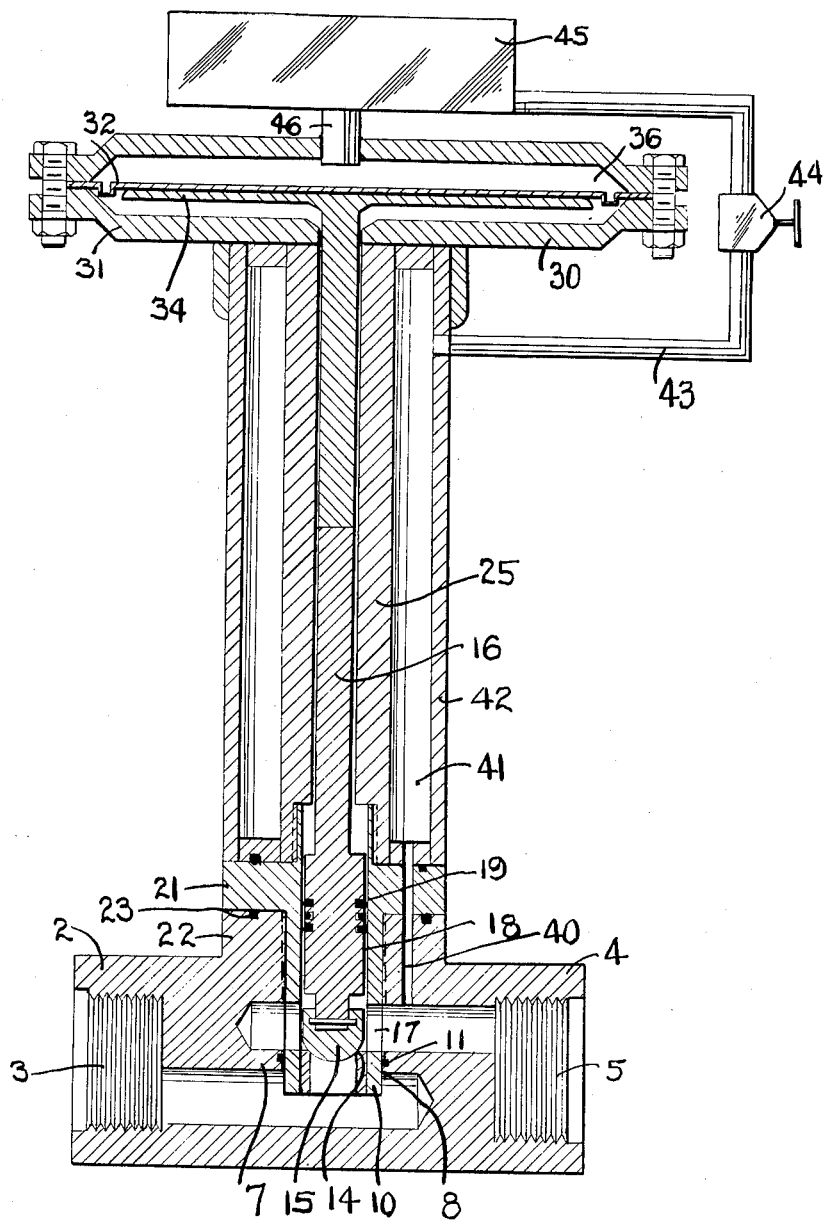

2,674,267

UNITED STATES PATENT OFFICE 2,674,267

PRESSURE REGULATED MOTOR VALVE

John Henry McCarvell, Houston, Tex., assignor to Macco Oil Tool Company, Houston, Tex., a partnership Application November 17, 1950, Serial No. 196,301

3 Claims. (Cl. 137—632)

1

The invention relates to what is generally designated in the art as a motor valve because of its power operation by the pressure fluid, the flow of which is controlled by the valve in a well flowing system for wells.

Where a well has been completed and may be flowing of its own inherent pressure, it often occurs that the formation pressure is depleted sufficiently that the oil is no longer lifted to the surface in the tubing, and it becomes necessary to apply one or more flow valves, usually spaced along the tubing, in order to accomplish the introduction of a pressure fluid to elevate the well liquids, such as oil and/or water, to the surface.

The present invention, therefore, relates generally to that shown and described in the prior Patent 2,339,487 to William R. King, January 18, 1944. The motor valve is shown at 35 in the drawing of such patent and may be designated as a "power valve."

Generally, such valve is connected to a source of fluid pressure, the flow of which into the well is controlled by the valve in order to utilize a minimum amount of such pressure fluid and to effect the maximum flowing of oil from the well.

The present invention is in the nature of an improvement which embodies an arrangement whereby when the pressure fluid is by-passed from the main supply line to the control regulator it is conducted through a condensation chamber so that any moisture in the pressure fluid, or carried thereby, would be condensed and permitted to drip back into the main line and prevent any interference thereof of the motor valve.

It is one of the objects of the invention to provide a motor valve in which a condensation chamber is arranged about its valve stem so as to permit the condensation of moisture therein from the fluid in the operation of the valve.

Still another object of the invention is to provide a motor valve having an enlarged cylindrical sleeve disposed around the valve stem and its yoke support and extending about the valve housing and a diaphragm unit to control the operation of the valve.

A still further object is to provide the combination of a motor control valve carrying a by-pass from the fluid pressure being valved so as to provide a pressure fluid whose flow to a diaphragm unit for control of the motor valve is determined by a mechanical intermitter time regulator.

Other and still further objects of the invention will be readily apparent when considered in connection with the accompanying drawing, wherein

2 the single view is a vertical section of the valve by-pass diaphragm unit and the connections therefor.

The valve generally is designated by the housing 2 which is connected by the thread 3 to a source of high pressure fluid. The opposite end 4 of such housing is connected at 5 to a low pressure line leading into the well for the flow of pressure fluid.

A barrier, or partition, 7 divides the inlet high pressure end from the low pressure end 5 and has an opening 8 therethrough in which a liner 10 has been disposed. Suitable seals 11 insure the sealing of the liner 10 in the partition 7.

A valve seat 14 is disposed in the liner and is arranged to be engaged by a valve member 15 which is vertically slidable in the liner 10 by means of the stem 16. A port 17 in this liner is closed or opened by the raising or lowering of the valve 15 by the stem 16.

The liner 10 is hollow to receive the valve 15 in the valve chamber 18 thereof. Seal rings 19 form a seal between the valve and the liner.

The liner has a lateral flange 21 which abuts against the extension 22 of the housing and is sealed thereon by the seal rings 23.

A yoke 25 is shown as abutting the flange 21 and extending upward about the stem 16 so as to serve as a support for a diaphragm unit 30 which is connected on the upward end 16.

The diaphragm unit has the housing 31 made up of the upper and lower portions in order to clamp the diaphragm 32 therebetween. The upper end of the stem 16 has an enlarged flange 34 which bears against the diaphragm so as to provide sufficient power upon the diaphragm to move the valve when a pressure fluid is introduced into the chamber 36 in the diaphragm housing above the diaphragm 32.

The high pressure end of the housing abuts the lower end of the valve 15 and tends to raise or open the valve. This tendency is overcome by the pressure against the diaphragm and the valve stem in the chamber 36 and the diaphragm unit 30.

While the invention has been described as applied to a power valve, it seems obvious that the condensation and drip chamber may be incorporated in a regulator supply line regardless of the type of valve.

In operation the pressure fluid will be admitted to the well in order to actuate the valves in the flowing operation. When, however, such pressure introduced to the well builds up to a predetermined value, such pressure will build up in the low pressure side of the housing. A conduit 40 is shown as extending from the flow passage through the valve, through the housing, through the liner 21, and into a chamber 41 which will be designated as a condensation chamber. This chamber is created by a sleeve 42 which extends from the liner to the diaphragm unit so as to provide a cylindrical annulus about the yoke 25.

This pressure fluid is then passed through a pipe 43, a reducer valve 44, and thence into a time control intermitter regulator 45 which is illustrated merely generally. This regulator, in turn, is connected by the nipple 46 into the chamber 36 of the diaphragm unit 30. This regulator 45 may take any desired form and may be that of the King patent aforesaid, or various other forms which are on the market and valuable to the industry as that manufactured by the Fisher Governor Company, Marshall, Iowa, and illustrated in the Fisher Time Cycle Intermitters, Series 4500.

It should be apparent from the foregoing that the pressure fluid may accumulate under a pressure in the condensation chamber 41 and moisture carried by the pressure fluid will tend to condense for obvious reasons so that a liquid may tend to accumulate in the base of the chamber 41. This liquid will drip back into the main line and the housing 2 through the conduit 40 so as to remove such moisture from the regulator and diaphragm to avoid the accumulation thereof and the interference with the operation of the device. When such pressure builds up, the regulator 45 will admit pressure fluid and effect a closing of the motor valve, whereas, when such admitted pressure is dissipated in the well, then there will be a reduction of the pressure in the drip chamber. A re-opening of the main valve 15 may then occur because of the high pressure against the valve. If desired, a vent or leak for the escape of pressure from the chamber 36 through the upper part of the unit 30 may be provided. None has been shown.

Broadly, the invention contemplates the arrangement of a condensation and drip chamber with a motor or power operated valve so as to eliminate the moisture from the pressure valve.

What is claimed is:

1. A motor valve including a housing, a flow passage therethrough, a valve chamber, a valve member slidable therein to open and close said passage, a stem to actuate said valve, a seal about said valve in said chamber, fluid pressure means to control the movement of said stem, a condensation housing about said stem, a drip chamber therein, conduit from said passage beyond said valve into said drip chamber, and through which the fluid pressure to actuate said means must flow whereby condensate drips back into the flow passage.

2. A motor valve for controlling the flow of pressure fluid from a source to a well and comprising a housing, a valve stem extending therefrom, a yoke supporting said stem, a diaphragm unit on said yoke, a drip chamber for pressure fluid condensate including a sleeve extending from said housing to said unit, a conduit through said housing into said sleeve, and a connection from said sleeve around said diaphragm whereby condensate of pressure fluid may drip back into said housing.

3. A motor valve comprising a housing, a flow passage, a valve member to close said passage, a valve stem, a yoke to support said stem, a diaphragm unit on said yoke and connected to actuate said stem, a bypass from said housing around said unit for a flow of pressure fluid from the down stream side of said valve, a pressure regulator device in said bypass operable to control the operation of said valve by the periodic admission of pressure fluid to said diaphragm, and a condensate drip chamber including a sleeve about said yoke as a portion of said bypass so that the condensate may drip back into said housing.

References Cited in the file of this patent
UNITED STATES PATENTS

| Number | Name | Date |
|---|---|---|
| 1,262,225 | Meyer | Apr. 9, 1918 |
| 1,470,057 | Carter | Oct. 9, 1923 |
| 1,526,921 | McNamara | Feb. 17, 1925 |
| 1,637,230 | Mueller | July 26, 1927 |
| 1,860,516 | Thomas et al. | May 31, 1932 |
| 2,323,838 | Nixon | July 6, 1943 |
| 2,339,487 | King | Jan. 18, 1944 |

FOREIGN PATENTS

| Number | Country | Date |
|---|---|---|
| 968,576 | France | Apr. 26, 1950 |